US006251500B1

(12) United States Patent
Varga et al.

(10) Patent No.: US 6,251,500 B1
(45) Date of Patent: Jun. 26, 2001

(54) WRITE-ON/WIPE OFF WALL COVERING

(75) Inventors: Richard S. Varga, Akron; John L. Baechle, Hudson, both of OH (US)

(73) Assignee: RJF International Corporation, Fairlawn, OH (US)

( * ) Notice: Subject to any disclaimer, the term of this patent is extended or adjusted under 35 U.S.C. 154(b) by 0 days.

(21) Appl. No.: 09/240,806

(22) Filed: Feb. 1, 1999

(51) Int. Cl.[7] .......... B32B 3/00
(52) U.S. Cl. .......... 428/195; 358/293
(58) Field of Search .......... 428/195; 358/293

(56) References Cited

U.S. PATENT DOCUMENTS

| | | | |
|---|---|---|---|
| 2,112,762 | 3/1938 | Chatfield . | |
| 3,922,457 | 11/1975 | Barnwell et al. | 428/207 |
| 4,027,086 | 5/1977 | Lo Valvo, et al. | 526/76 |
| 4,335,238 | 6/1982 | Moore et al. . | |
| 4,587,568 | 5/1986 | Takayama et al. | 358/293 |
| 4,667,254 | 5/1987 | Araki et al. | 358/293 |
| 4,746,576 | 5/1988 | Ozu et al. . | |
| 4,804,572 | 2/1989 | Bodrogi | 428/195 |
| 4,940,628 | 7/1990 | Lin et al. . | |
| 4,996,110 | 2/1991 | Tanuma et al. . | |
| 5,361,164 | 11/1994 | Steliga | 359/455 |
| 5,594,061 | 1/1997 | Sharma et al. | 524/503 |
| 5,683,557 | 11/1997 | Tuminello et al. | 264/164 |
| 5,690,878 | 11/1997 | Tuminello et al. | 264/203 |
| 5,721,309 | 2/1998 | Sharma et al. . | |
| 5,752,837 | 5/1998 | Palmer | 434/413 |
| 5,913,686 | 6/1999 | Van Winkle | 434/267 |

FOREIGN PATENT DOCUMENTS

| | | |
|---|---|---|
| 0110123 | 6/1984 | (EP) . |
| 0320174 | 6/1989 | (EP) . |
| 0848031 | 6/1998 | (EP) . |
| 59-125980 | 7/1984 | (JP) . |
| 63-061032 | 3/1988 | (JP) . |
| 2024140 | 1/1990 | (JP) . |
| 2151437 | 6/1990 | (JP) . |
| 02300388 | 12/1990 | (JP) . |
| 03275860 | 6/1991 | (JP) . |
| 03269184 | 11/1991 | (JP) . |
| 4202280 | 7/1992 | (JP) . |
| 5092530 | 4/1993 | (JP) . |
| 06073326 | 3/1994 | (JP) . |
| 6108370 | 4/1994 | (JP) . |
| 7016998 | 1/1995 | (JP) . |
| 7238264 | 9/1995 | (JP) . |
| 08127975 | 5/1996 | (JP) . |
| 10096198 | 4/1998 | (JP) . |
| 10175270 | 6/1998 | (JP) . |
| 10306166 | 11/1998 | (JP) . |
| WO 99/45079 | 9/1999 | (WO) . |

OTHER PUBLICATIONS

Hawley's Condensed Chemical Dictionary, date 1993, p. 531.*

* cited by examiner

*Primary Examiner*—N. Edwards
(74) *Attorney, Agent, or Firm*—Fay, Sharpe, Fagan, Minnich & McKee, LLP

(57) ABSTRACT

The protective coating on the front face of decorative vinyl wall covering is made from a dry wipeable fluorocarbon polymer. The product can be used like conventional wall paper or vinyl wall covering to provide a fanciful, decorative design covering some or all of the walls of a room. However, this fanciful, decorative design can be written on as desired, since markings on the product can be easily removed.

18 Claims, 1 Drawing Sheet

WRITE-ON/WIPE OFF WALL COVERING

BACKGROUND OF THE INVENTION

Conventional, decorative vinyl wall coverings are typically formed from a sheet of calendered polyvinyl chloride (PVC) resin formulation printed on its front face with fanciful designs and colors. A backing layer composed of a woven or non-woven sheet of polyester and/or cotton fibers may be bonded to the back face of the PVC sheet for dimensional stability, while a thin protective coating composed of an essentially transparent polymer can be bonded to the front face of the sheet.

The protective coatings currently used on commercially-available wall coverings adequately protect the underlying PVC sheet, including its fanciful design, from damage and abuse. Nonetheless, it is still difficult to remove certain types of markings from such products. For example, markings made from crayon, ink, paints and other materials often found in homes with children are often difficult to remove. That is why children in most homes are encouraged, in the strongest of terms, not to write on the walls.

SUMMARY OF THE INVENTION

Against this background, the present invention provides a new, decorative vinyl wall covering for use in decorating walls found in homes and other structures which is specifically designed to be writable and erasable.

This new, write-on/wipe-off wall covering takes the form of an elongated sheet composed of a continuous sheet of flexible plastic material having essentially the same size and shape as conventional vinyl wall coverings. The front face of this continuous sheet bears a decorative design of the same type as conventional wall coverings, and a protective covering is also applied to this front face to prevent it from being damaged or destroyed. However, in the case of the present invention, this protective coating is formed from a fluorocarbon polymer that is dry erasable—i.e., it can be easily erased with a suitable dry eraser when marked with a dry erasable ink.

With this structure, the inventive wall covering can be used in the same way as conventional wallpaper or other wall covering to provide a fanciful, decorative design covering some or all of the walls of a child's bedroom, for example. However, in this room, the child can be allowed or even encouraged to mark up the "covered" walls with his/her own designs, preferably using a dry erasable marker provided by his parents for this purpose, since these marks can be easily removed whenever desired. Similarly, the inventive wall covering can also be used by adults in a variety of different applications such as office areas, board rooms, conference rooms, near desks, in hallways or meeting areas, etc. Because the inventive wall covering is so easy to clean, individuals can "write on" its decorative design and then "wipe off" the notes/comments/drawings etc. so written without disturbing or destroying the design aesthetics of the wall covering itself.

BRIEF DESCRIPTION OF THE DRAWINGS

The present invention may be more readily understood by reference to the following drawings wherein.

DETAILED DESCRIPTION

Figure 1:
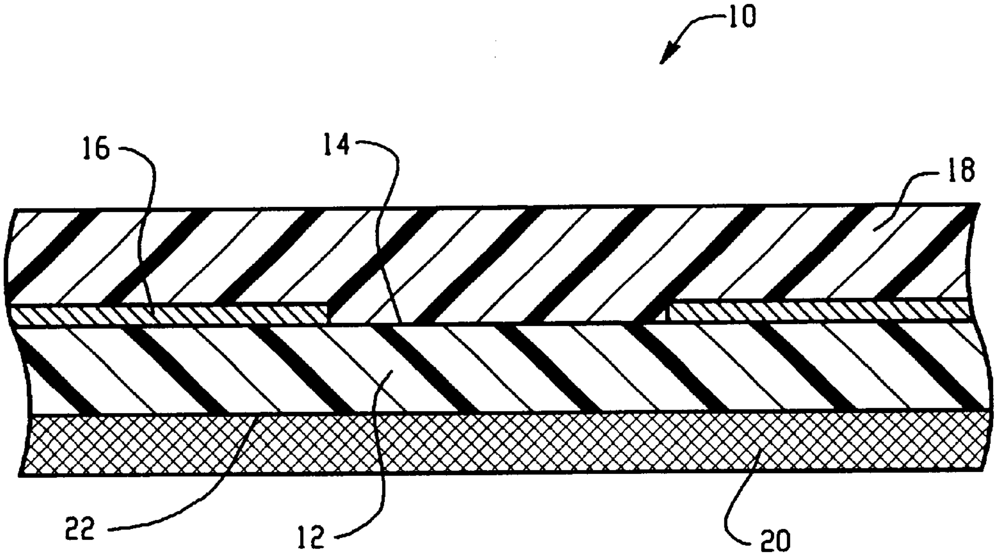
FIG. 1 is a schematic cross-section illustrating the structure of a preferred write-on/wipe off wall covering made in accordance with the present invention.

FIG. 1 shows an example of the write-on/wipe off wall covering of the present invention generally indicated at 10. Wall covering 10 is formed from a continuous sheet 12 of plastic material, preferably a polyvinyl chloride homopolymer or copolymer resin. The front face 14 of continuous sheet 12 carries discrete markings or areas of single or multiple colors, hereinafter "indicia" 16, typically formed by printing which, in the aggregate, form a decorative design on front face 14 of sheet 12. A protective coating 18 is bonded to front face 14 to protect continuous sheet 12 including indicia 16 thereon. An optional backing layer 20 is bonded to the rear face 22 of continuous sheet 12 to impart dimensional stability to the overall product, when desired.

The inventive wall covering is intended to be a replacement for, and to be used in the same was as, conventional vinyl wall coverings. Therefore, wall covering 10 is made to have essentially the same size, shape and flexibility as conventional vinyl wall covering. Thus, wall covering 10 typically takes the form of an elongated sheet 1 to 3 feet, more typically 24 to 27 inches, wide for residential use and 4 to 30 mils (0.004 to 0.030) inches thick, preferably 8 to 22 mils (0.008 to 0.022 inches) thick. For commercial use such as in businesses, hospitals, hotels, convention centers and the like, the inventive wall covering can be made any conventional length and width such as 53 to 56 inches wide and 80 to 100, preferably 90 feet long. Like conventional wall coverings, the inventive wall covering is intended to be supplied to the consumer in "rolls", with "single rolls" having about 30 to 40 square feet of material and being about 15 to 25 feet long and "double rolls" containing about 60 to 80 square feet of material and being about 30 to 45 feet long. For commercial use, rolls having on the order of 405 square feet of material, or any other convenient amount, can be used.

In the particular embodiment shown, continuous sheet 12 is formed from polyvinyl chloride, optionally filled with a suitable material to provide opacity and a base color. Alternatively, continuous sheet 12 can be unfilled for allowing transparency. Other conventional materials used for forming wall coverings can be used in place of polyvinyl chloride.

In the particular embodiment shown, backing layer 20 is composed of a web of flat, woven polyester fibers, the web being bonded to the rear face 22 of sheet 12 using a PVC plastisol. The web forming backing layer 20 can be made from other materials such as cotton, a mixture of cotton and polyester fiber or other materials, and it can be a non-woven fabric or the like. Backing layer 20 can also be made from a continuous sheet rather than a foraminous web, if desired.

Indicia 16 are provided on front face 14 of sheet 12 by printing in a conventional manner. Indicia 16 have a different color from the color of sheet 12 so that indicia 16, in the aggregate, form a fanciful design on front face 14 of sheet 12. Preferably, different indicia 16 have different colors so that a multi-colored design is produced. The fanciful design formed by indicia 16 can take essentially any form. It can be definite in its composition in the sense that it defines a picture or likeness of something, letters, numbers, outlines of information, games such as tic tac toe, etc. It can also contain information for specific uses, such as multiplication tables for schools, graphs, maps, business slogans, mottoes, business forms, etc. Alternatively, the design can be random in form such as a stucco design. The design can also be regular, free form in its composition such as a weave pattern or stripes.

Figure 2:
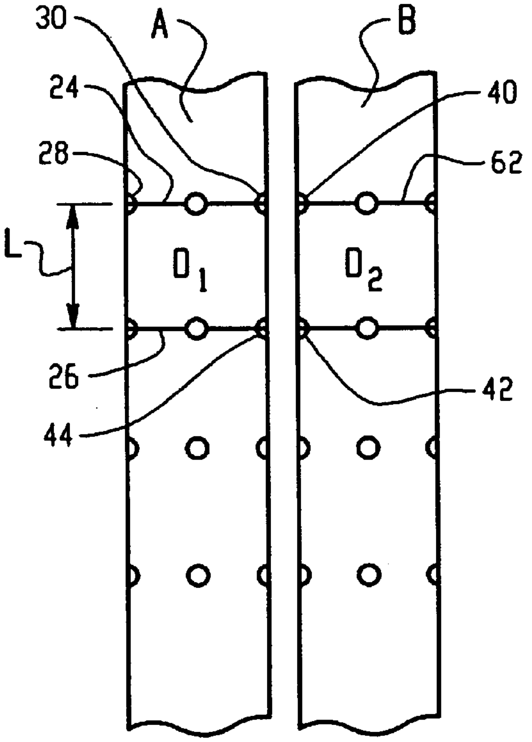
FIG. 2 is a schematic view illustrating two sections of wall covering of the present invention mounted on a wall in side-by-side relation, the two sections being separated from one another in the figure for illustrative purposes.

FIG. 2 illustrates two sections of wall covering taken from a roll of the inventive wall covering, one section marked A and the other marked B, these two sections being mounted on a wall in side-by-side relation. As shown in this figure, a design $D_1$ is formed by indicia 16 in a rectangular area of the wall covering, design $D_1$ having a top 24, a bottom 26, a length L and a width corresponding to the width of the wall covering itself. As also shown, design $D_1$ repeats itself a number of times in the longitudinal direction of the inventive wall paper in a conventional manner. Typically design $D_1$ repeats itself at least ten times, more typically at least twenty times, over the length of a "single roll" of the inventive wall covering. Also, as typical, the length L of the design is preferably chosen so that the design repeats itself in the longitudinal direction an integral number of times, e.g. six to ten times, in the standard height of most dwelling rooms, eight feet.

As further shown in FIG. 2, design $D_1$ is so formed that the left side of the design forms a complementary match with the right side of the design. Specifically, indicia 28 in the upper left hand corner of design $D_1$ forms a complementary match with indicia 30 in the upper right hand comer of design $D_1$. This means that when adjacent section B of wall covering is placed contiguous to first section A so that the right side of design $D_1$ matches the left side of design $D_2$, the top 62 of design $D_2$ registers exactly with the top 24 of design $D_1$ in section A. Specifically, indicia 40 in the upper left hand corner of design $D_2$ registers exactly with indicia 30 in the upper right hand corner of design $D_1$, while indicia 42 in the lower left hand comer of design $D_2$ registers exactly with indicia 44 in the lower right hand corner of design D1.

Figure 3:
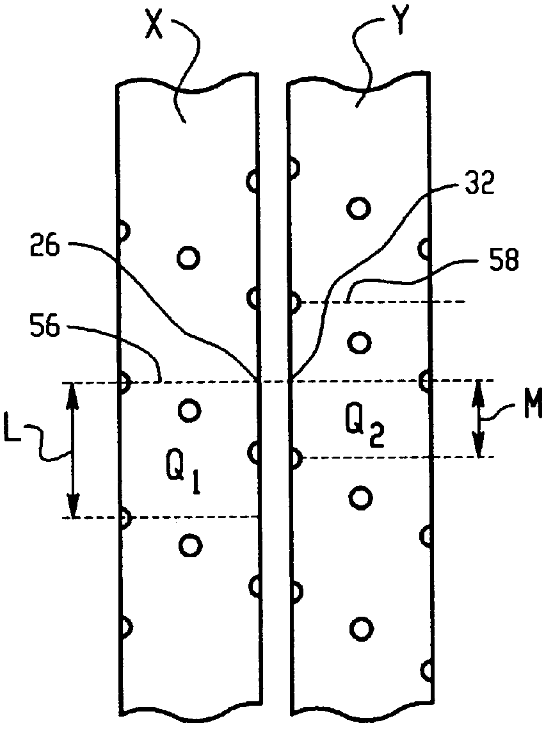
FIG. 3 is a schematic view similar to FIG. 2 illustrating another wall covering of the present invention having a different design than the wall covering of FIG. 2.

FIG. 3 illustrates another example of the inventive wall covering which is similar to that of FIG. 2, except that its design is different. In particular, design Q in this wall covering is so made that the top 56 of design $Q_1$ in section X does not register with the top 58 of design $Q_2$ in section Y when the right side of design $Q_1$ matches the left side of design $Q_2$. Rather, sections X and Y must be offset by a distance M representing one-half of the length L of design Q in order that the left and right sides of the design in adjacent sections match. In any event, it can be seen that in both embodiments of the present invention as shown in FIGS. 2 and 3, contiguous sections of wall covering when properly aligned on the wall form a continuous pattern of the wall covering's decorative design repeating itself across the wall.

In another embodiment of the invention, the individual sections of wall covering taken from a roll of the inventive wall covering, such as sections A and B in FIG. 2, are arranged on a wall horizontally rather than vertically as shown in FIGS. 2 and 3. This arrangement eliminates vertical seams from adjacent sections of wall covering, which is beneficial where the inventive wall covering is intended to be marked by writing words or the like in a conventional manner.

Referring again to FIG. 1, protective covering 18 is made from a fluorocarbon polymer which is dry wipeable. "Dry erasable" or "dry wipeable" surfaces are well known. These surfaces are typically formed from fluorocarbon polymers so formulated that a solvent-based ink, capable of drying to a powder after it has been applied to the surface, can be removed by wiping with a dry eraser or cloth. The ink, after it dries, will adhere to the dry erasable writing surface for a long period of time without significant degradation, but can be readily and easily removed by simple wiping. See, for example, U.S. Pat. No. 5,361,164, the disclosure of which is incorporated herein by reference.

A number of different fluorocarbon polymers are known which will form writable/dry wipeable surfaces. Examples include polymers and co-polymers which contain one or more polymerized monomers selected from the group consisting of tetrafluorethylene (TFE), chlorotrifluoroethylene (CTFE), vinyl fluoride (VF), vinylidene fluoride (VDF) and hexafluouropropylene (HFP). Preferred polymers and co-polymers are those containing at least 50% by weight TFE, CTFE, VF, VDF, HFP or mixtures thereof. Preferred polymers are polyethylene/tetrafluoroethylene (poly ETFE), poly-ethylene/chlorotrifluoroethylene (poly ECTFE), polytetrafluoroethylene (poly TFE), poly-vinyl fluoride (poly-VF) and poly-vinylidene fluoride (poly-VDF). Especially preferred polymers are co-polymers containing at least 50% by weight VDF, especially VDF/HFP copolymers. An especially preferred polymer is sold by Elf-Autochem North America Inc. of King of Prussia, Pennsylvania, under the designation of Kynar 2800. Other examples of suitable writable/dry wipeable fluorocarbon polymers are disclosed in U.S. Pat. No. 4,746,576 and U.S. Pat. No. 3,922,457, the disclosures of which are incorporated herein by reference.

Particular commercially available polymers which are useful in forming protective covering 18 are ACLAR (available from Allied Signal Corp. and believed to be a chlorotrifluoroethylene copolymer), KORTON-K 720 (available from Norton/Allied and believed to be a polyvinylidene chloride polymer), and KYNAR 730 (2800 (available from Autochem North America and believed to be a polyvinylidene chloride homopolymer).

The thickness of protective layer 18 can vary widely and any suitable thickness can be employed so long as the protective function of this layer is retained. Also, protective layer 18 can be made with a matte finish so at to give a dull, non-glare surface appearance or with a "polished" surface to give a high gloss surface appearance. The inventive wall covering is preferably made by laminating protective coating 18 onto continuous sheet 12 after it has been printed with indicia 16. For this purpose, a film formed from the fluorocarbon polymer and having a thickness of approximately 0.2 to 2, preferably 0.3 to 1 mil, more preferably about 0.5 mil, has been found suitable. If desired, an adhesive can be used to increase the bonding strength of protective coating 18 to continuous layer 12.

In this connection, adhesives capable of bonding fluoropolymers to other surfaces are known and commercially available. The chemical compositions of many of these adhesives are proprietary, and in the particular embodiment shown herein, a proprietary adhesive of unknown composition was employed. Also, the surface of protective coating 18 can be treated to enhance its adhesion to continuous sheet 12, with or without adhesive. Corona discharge and other treatment techniques are well known in the art for enhancing the bonding strength of fluorocarbon and other polymer films to substrates. Any of these techniques can be used in accordance with the present invention to increase the bonding strength of protective coating 18 to continuous layer 12.

In a particular embodiment illustrating the present invention, Kynar 2800 fluorocarbon resin obtained from Autochem North America was in the form of a sheet 60 inches wide and 0.3 mil thick was laminated to a formulated PVC sheet containing vinyl chloride resin, a filler, a plasticizer, a colorant and a stabilizer. The composite so formed was tested by marking with a number of commercially available markers including Sharpie, Major Accent, Berol, Mighty Mark. Avery Dennison and Carter pens. The marks made by these pens were all removed using liquid cleaner. The composite was also marked with an Expo marker (manufactured by Sanford) and the mark so made was dry erased after four days exposure. This demonstrates that marks made by conventional markers can be easily removed using liquid cleaners, while dry erasable inks can be readily dry erased from this composite.

The inventive wall covering can be used in the same way as conventional decorative wallpaper or other wall covering. For example, it can be used to cover all of the walls of a room, half the walls or only some of the walls, such as all of one wall only or the top half of one or more walls, etc. Like conventional wall coverings, the inventive wall covering serves a decorative function in that it imparts a pattern of its decorative design over the entire wall area it covers. However, the inventive wall covering also provides a marking surface over all of the area it covers which can be readily marked and easily erased with dry erasers or liquid solvents. This enables the walls of a room to be purposely used as a writing/marking surface even though they have previously been decorated with the fanciful, decorative designs previously available only in expense commercial wall coverings. Thus, the inventive wallcovering can be used not only as a decorative device in the manner of conventional wall coverings but also, simultaneously, as an instructional and/or informational tool for proving suitable information for a variety of different purposes.

Although only a few embodiments of the present invention have been described above, it should be appreciated that many modifications can be made without departing from the spirit and scope of the present invention. All such modifications are intended to be included within the scope of the present invention, which is to be limited only be the following claims.

We claim:

1. A flexible write-on/wipe-off decorative wall covering for applying a fanciful, decorative pattern to walls, said wall covering comprising:

an elongated multilayered sheet whereby the elongated multilayered sheet is rollable upon itself to form a roll of wall covering for easy transport and use, the elongated multilayered sheet comprising:

a continuous flexible vinyl layer, the vinyl layer having a front face and a rear face, said front face having thereon a decorative design formed from indica of differing colors, the decorative design being arranged so that sections of wall covering which are taken from the elongated multilayered sheet and mounted on a wall contiguous to one another produce a continuous pattern of the decorative design across the wall on which the contiguous sections are mounted; and, a dry erasable fluorocarbon polymer film bonded to the front face of the vinyl layer, said dry erasable fluorocarbon film being such that dry erasable ink is removable therefrom without liquid cleaner.

2. The wall covering of claim 1, wherein a length of the elongated multilayered sheet is at least five times its width.

3. The wall covering of claim 2, wherein the decorative design repeats itself six to ten times in a span of eight feet along the length of the elongated multilayered sheet.

4. The wall covering of claim 3, wherein the decorative design is so formed that a top of the design in one section of wall covering registers with a top of the design in a contiguous section of wall covering when the two sections are mounted on a wall so that their sides match.

5. The wall covering of claim 3, wherein the decorative design is so formed that a top of the design in one section of wall covering is offset form a top of the design in a contiguous section of wall covering by a distance equal to one-half a total length of the decorative design when the two sections are mounted on a wall so that their sides match.

6. The wall covering of claim 1, further comprising a backing layer bonded to the rear face of the vinyl layer for providing dimensional stability to the wall covering.

7. The wall covering of claim 6, wherein the backing layer is composed of a fabric of woven or non-woven fibers, and further wherein the backing layer is bonded to the vinyl layer by means of an adhesive.

8. The wall covering of claim 7, wherein the fibers are selected from polyester fibers, cotton fibers or a combination of both.

9. The wall covering of claim 1, wherein the fluorocarbon polymer contains at least one polymerized monomer selected from the group consisting of TFE, VF, VDF and HFP.

10. The wall covering of claim 1, wherein the fluorocarbon polymer is poly ETFE, poly ECTFE, poly TFE, ploy-VF or poly-VDF.

11. The wall covering of claim 1, wherein the fluorocarbon polymer is a copolymer containing at least 50 wt. % VDF.

12. A flexible wall covering having a multicolor design viewable on an outward facing side thereof arranged such that when sheets of the wall covering are placed contiguous to one another a coherent decorative appearance is achieved on the outward facing side, said flexible wall covering comprising:

a dry-erase surface on the outward facing side from which dry erase ink is removable without liquid cleaners.

13. The flexible wall covering according to claim 12, wherein the dry erase surface is formed from a fluorocarbon polymer film.

14. The flexible wall covering according to claim 13, wherein the fluorocarbon polymer film has a thickness of approximately 0.2 to 2.0 mils.

15. The flexible wall covering according to claim 12, wherein the design repeats itself multiple times along a length of a single sheet of the wall covering.

16. The flexible wall covering according to claim 12, wherein a sheet of the wall covering has a width selected from ranges of 24 to 27 inches and 53 to 56 inches, and a length selected from ranges of 15 to 25 feet and 30 to 45 feet.

17. The flexible wall covering according to claim 12, wherein the wall covering comprises:

a vinyl substrate on which the design is formed; and, a backing layer bonded to the vinyl substrate for providing dimensional stability to the wall covering, said backing layer being on a side of the vinyl substrate opposite the outward facing side.

18. The flexible wall covering according to claim 17, wherein the dry erasable surface is formed from a fluorocarbon film bonded to the vinyl substrate on the outward facing side.

* * * * *